No. 659,286. Patented Oct. 9, 1900.
R. A. BRIGGS.
BIT.
(Application filed Aug. 11, 1897.)
(No Model.)

Witnesses
Marcus L. Byng.
M. F. Vaughan

Inventor
Robert A. Briggs
by John Wedderburn
Attorney

United States Patent Office.

ROBERT A. BRIGGS, OF RUDD, IOWA.

BIT.

SPECIFICATION forming part of Letters Patent No. 659,286, dated October 9, 1900.

Application filed August 11, 1897. Serial No. 647,867. (No model.)

*To all whom it may concern:*

Be it known that I, ROBERT A. BRIGGS, of Rudd, in the county of Floyd and State of Iowa, have invented certain new and useful Improvements in Bridle-Bits; and I do hereby declare the following to be a full, clear, and exact description of the invention, such as will enable others skilled in the art to which it appertains to make and use the same.

This invention relates to bridle-bits, and has for one object to provide a simple and reliable bit which is adjustable to different animals and which may be readily increased or diminished in size, so as to adapt the same to fit vicious animals when necessary.

The prime object of the present invention is to provide simple and effective means, whereby the bit-sections may be caused to bind with any desired pressure against the mouth or cheeks of the animal porportionate to the force applied to the lines for facilitating the management of the animal by the driver.

Figure 1:
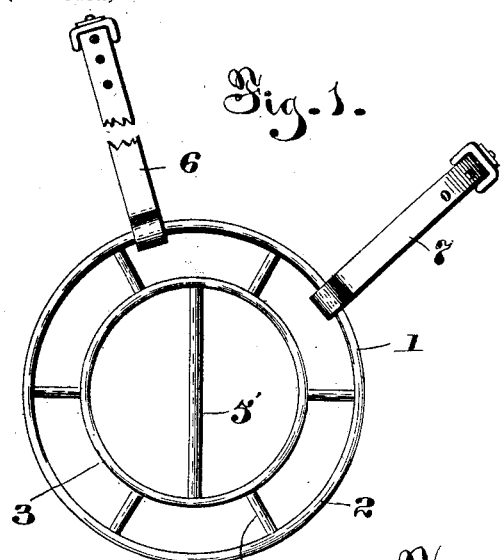
Figure 2:
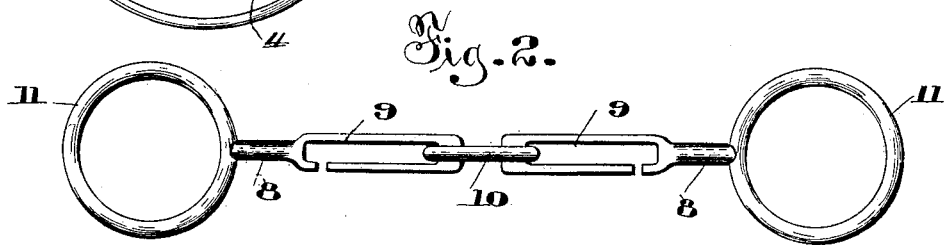
Figure 3:
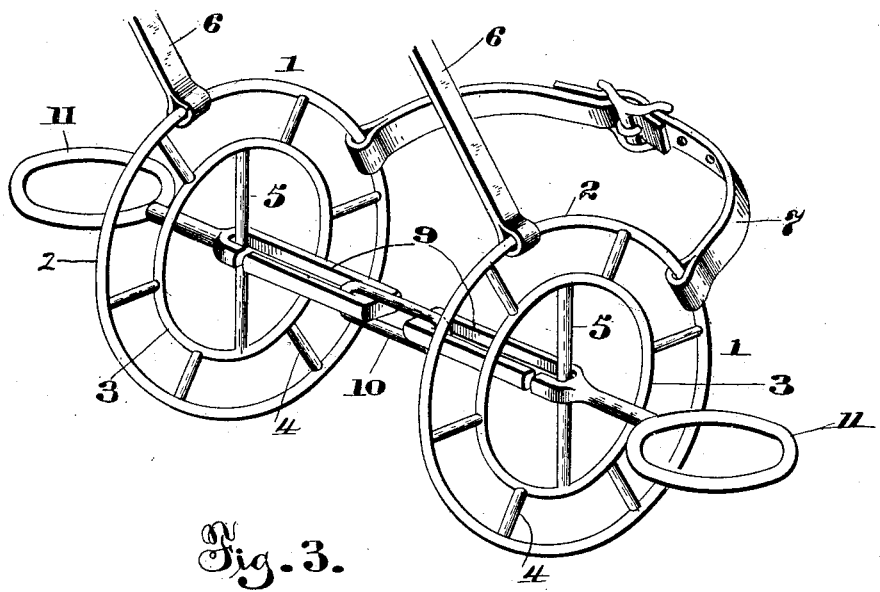

In the accompanying drawings, Figure 1 is a side view of one portion of the bit, showing one of the side rings and the adjusting-straps. Fig. 2 is a similar view of the jointed portion of the bit by means of which the rings are operated. Fig. 3 is a perspective view of the complete bit, showing the several parts thereof assembled in proper working relation.

Similar numerals of reference designate corresponding parts in the several views.

The improved bridle-bit contemplated in this invention comprises a pair of rings, (indicated at 1,) the same consisting, preferably, of an outer band or ring 2 and an inner ring 3, connected to the outer ring by means of a series of radial bars 4, the inner ring 3 being provided with a diametrical cross-bar 5, the purpose of which will hereinafter appear. The rings 1 are connected at suitable points by a head-strap 6, provided with a buckle and a longitudinal series of perforations, whereby the strap may be increased or diminished in length for regulating the bit to different animals. At another point the rings are connected by an auxiliary strap 7, forming the nose-strap, said strap being also adjustable for correspondingly adjusting the distance between the rings for accommodating the device to different animals.

8 designates a pair of snaffle-bars, the main body portions of which are provided with longitudinal slots 9 and recessed on the rear side, as shown in Fig. 3 of the drawings. The snaffle-bars are connected at their inner adjacent ends by means of a link 10, permitting relative rocking movement of the bars, and said bars are further provided at their outer ends with rings or eyes 11 for the attachment of the reins or lines in the ordinary manner. A portion of each snaffle-bar lying at one side of the longitudinal slot therein is separated at one end or cut into, so as to admit of the cross-bars in the outer rings or cheek-pieces 1 being placed within said slots, and said cross-bars are adapted to move in and out in said slots as the snaffle-bars are drawn upon by the lines.

In view of the foregoing description it will be seen that when the lines or reins are drawn upon the snaffle-bars by reason of their jointed connection will be drawn back and the cross-bars of the rings or cheek-pieces will be caused to slide inward within their respective slots, thus forcing said rings or cheek-pieces with a pressure proportionate to the amount of force placed on the lines against the cheeks of the animal. By tightening the head and nose straps the bit may not only be adjusted to different animals, but it may be tightened upon any animal which is particularly vicious, the shorter the distance between the cheek-pieces the greater being the pressure exerted against the animal's mouth when the snaffle-bars are drawn backward. Instead of employing the cross-bars in the cheek-pieces each cheek-piece may be provided with a swivel or pivoted bail or eye 12, which may be entered in the slot in the snaffle-bar instead of the cross-bar. By reason of this particular connection between the snaffle-bars and cheek-pieces the latter will bear flatwise against the cheeks of the animal at each side of the mouth. This and other changes in the form, proportion, and minor details of construction may be resorted to without departing from the principle or sacrificing any of the advantages of the invention.

The special features of advantage in my improved construction are found in the fact that I obtain a direct leverage against the cheek-pieces to the full length of each snaffle-bar, the pressure of the cheek-pieces on the jaws depending upon the pressure upon the reins attached to the loops 11, and in the further fact that the cheek-pieces are readily inserted into or removed from the slots in the snaffle-bars by passing the cross-bars 5 through the openings near the ends of the said slots.

Having thus described the invention, what is claimed as new, and desired to be secured by Letters Patent, is—

In a snaffle-bit for bridles, cheek-pieces provided with the bars 5 and connected by an adjustable nose-strap, in combination with the slotted snaffle-pieces 8 8 connected by a link 10 and having the usual rein-links 11 at the outer ends substantially as shown and described, for the purpose set forth.

In testimony whereof I have signed this specification in the presence of two subscribing witnesses.

R. A. BRIGGS.

Witnesses:
C. B. CROSBY,
F. CLOUGH.